United States Patent
Choi et al.

(10) Patent No.: US 8,837,844 B2
(45) Date of Patent: Sep. 16, 2014

(54) IMAGE PROCESSING METHOD AND IMAGE PROCESSING APPARATUS USING LEAST SIGNIFICANT BITS

(75) Inventors: Jong-bum Choi, Suwon-si (KR); Woo-sung Shim, Suwon-si (KR); Sung-bum Park, Seongnam-si (KR); Young-ho Moon, Suwon-si (KR); Dai-Woong Choi, Seoul (KR); Jae-won Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 880 days.

(21) Appl. No.: 12/425,478

(22) Filed: Apr. 17, 2009

(65) Prior Publication Data
US 2009/0285497 A1    Nov. 19, 2009

(30) Foreign Application Priority Data
May 16, 2008    (KR) .................. 10-2008-0045482

(51) Int. Cl.
*G06K 9/46*  (2006.01)
*H04N 19/593*  (2014.01)
*G06T 9/00*  (2006.01)

(52) U.S. Cl.
CPC .......... *G06T 9/005* (2013.01); *H04N 19/00763* (2013.01)
USPC ........ 382/237; 382/233; 382/312; 250/208.1; 341/50

(58) Field of Classification Search
USPC .............. 382/232, 233, 237, 312; 250/208.1; 341/50
See application file for complete search history.

(56) References Cited

U.S. PATENT DOCUMENTS

| | | | | |
|---|---|---|---|---|
| 5,442,458 | A * | 8/1995 | Rabbani et al. | 382/247 |
| 5,881,173 | A * | 3/1999 | Ohmori | 382/232 |
| 6,119,189 | A * | 9/2000 | Gafken et al. | 710/110 |
| 6,310,591 | B1 * | 10/2001 | Morgan et al. | 345/84 |
| 6,456,742 | B1 * | 9/2002 | Chan | 382/245 |

FOREIGN PATENT DOCUMENTS

| | | |
|---|---|---|
| JP | 2000278536 A | 10/2000 |
| KR | 1020080034293 A | 4/2008 |

OTHER PUBLICATIONS

International Search Report and Written Opinion dated Nov. 20, 2009 issue by International Search Authority in counterpart application No. PCT/KR2009/002198.

* cited by examiner

*Primary Examiner* — Chan Park
*Assistant Examiner* — Eueng-Nan Yeh
(74) *Attorney, Agent, or Firm* — Sughrue Mion, PLLC

(57) ABSTRACT

Provided are an image processing method and image processing apparatus using least significant bits (LSBs). The image processing method includes generating first binary codes by converting pixel values of an input image into a binary code format; converting the first binary codes into gray codes and determining a predetermined number of sequential LSBs from among the gray codes; and generating second binary codes by converting the determined LSBs of the gray codes into the binary code format.

18 Claims, 5 Drawing Sheets

IMAGE PROCESSING METHOD AND IMAGE PROCESSING APPARATUS USING LEAST SIGNIFICANT BITS

CROSS-REFERENCE TO RELATED PATENT APPLICATION

This application claims the benefit of Korean Patent Application No. 10-2008-0045482, filed on May 16, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to image processing using least significant bits (LSBs), and more particularly, to an image processing method and apparatus using LSBs of gray code bit-planes or binary code bit-planes.

2. Description of the Related Art

If each pixel value is represented by using a bitstream, most significant bits of the bitstream may greatly contribute to characterize the image. By using such characteristics of images, a bit-plane into which a bit of a predetermined rank of each pixel value is inserted at every pixel position of an image, is used in image processing fields. If a pixel value of an image is represented by using eight bits, the number of bit-planes available for insertion is eight.

FIGS. 1A and 1B are a diagram and a flowchart, respectively, for describing a method of separating n least significant bit-planes 120 from an image formed of N bit-planes 110, according to a related art.

Referring to FIGS. 1A and 1B, if a pixel value is represented by using a bitstream including N bits, a highest-order bit of the bitstream is referred to as the most significant bit (MSB) and a last Nth bit of the bitstream is referred to as the least significant bit (LSB). Thus, when an image is represented by using bit-planes, the image includes the N bit-planes 110 from the MSBs to the LSBs. In the related art, in some cases, only LSBs including the LSB of each bitstream are used. Thus, the n least significant bit-planes 120 are separated from the N bit-planes 110 in operation 150 and are used to process the image.

FIG. 2 is a diagram illustrating bitstreams and bit-planes according to the related art of FIGS. 1A and 1B.

A bit-plane on an image pixel is represented as a binary code.

Referring to FIG. 2, for example, when pixel values of individual eight-bit bitstreams 211 through 217 are 127, 127, 128, 128, 128, 128, and 128, respectively, binary codes 210 corresponding to the pixel values are formed. In this case, bits at a predetermined pixel position of individual binary codes 211 through 217 are arranged on one bit-plane, and if bit-planes including bits 220 corresponding to four LSBs are separated from the binary codes 210, only four-bit binary codes 230 are separated.

However, although the pixel values of 127, 127, 128, 128, 128, 128, and 128 in the binary codes 210 have correlation and similarity with neighboring pixels, if only the four-bit binary codes 230 are separated, individual four-bit bitstreams 231 through 237 have values 15, 15, 0, 0, 0, 0, and 0, respectively, and thus the correlation and similarity with neighboring pixels is reduced.

SUMMARY OF THE INVENTION

The present invention provides an image processing method and image processing apparatus using LSBs, through which correlations between neighboring pixels may be considered when a predetermined number of least significant bit-planes are separated from an image represented by using a plurality of bit-planes.

According to an aspect of the present invention, there is provided an image processing method using LSBs, including generating first binary codes by converting pixel values of an input image into a binary code format; converting the first binary codes into gray codes and determining a predetermined number of sequential LSBs from among the gray codes; and generating second binary codes by converting the determined LSBs of the gray codes into a binary code format.

The generating of the first binary codes may include generating first bit-planes for binary codes of the input image.

The converting of the first binary codes into the gray codes and determining of the predetermined number of sequential LSBs may include generating second bit-planes for gray codes of the input image; and determining bit-planes corresponding to the predetermined number of sequential LSBs from among the second bit-planes.

The generating of the second binary codes may include generating third bit-planes for the second binary codes.

The image processing method may further include encoding the input image by using the generated second binary codes.

According to another aspect of the present invention, there is provided an image decoding method using gray codes, including generating first gray codes by converting received first binary codes into a gray code format; generating second gray codes comprising the first gray codes as sequential LSBs; and generating second binary codes by converting the second gray codes into a binary code format.

At least one of the first binary codes, the first gray codes, and the second gray codes may be formed in a bit-plane format.

The image decoding method may further include obtaining third gray codes for MSBs of the second gray codes, and the generating of the second gray codes may include generating the second gray codes by sequentially inserting the third gray codes into the MSBs of the second gray codes and sequentially inserting the first gray codes into the LSBs of the second gray codes.

The generating of the second gray codes may include generating the second gray codes by sequentially inserting the first gray codes into a predetermined number of LSBs.

According to another aspect of the present invention, there is provided an image processing apparatus using LSBs, including a first binary code generation unit generating first binary codes by converting pixel values of an input image into a binary code format; a gray code conversion unit converting the first binary codes into gray codes and determining a predetermined number of sequential LSBs from among the gray codes; and a second binary code reconversion unit generating second binary codes by converting the determined LSBs of the gray codes into a binary code format.

The first binary code generation unit may generate first bit-planes for binary codes of the input image.

The gray code conversion unit may generate second bit-planes for gray codes of the input image, and determine bit-planes corresponding to the predetermined number of sequential LSBs from among the second bit-planes.

The second binary code reconversion unit may generate third bit-planes for the second binary codes.

The image processing apparatus may further include an image encoding unit encoding the input image by using the generated second binary codes.

According to another aspect of the present invention, there is provided an image decoding apparatus using gray codes, including a first gray code conversion unit generating first gray codes by converting received first binary codes into a gray code format; a second gray code generation unit generating second gray codes comprising the first gray codes as sequential LSBs; and a second binary code conversion unit generating second binary codes by converting the second gray codes into a binary code format.

At least one of the first binary codes, the first gray codes, and the second gray codes may be formed in a bit-plane format.

The image decoding apparatus may further include a third gray code obtaining unit obtaining third gray codes for MSBs of the second gray codes, and the second gray code generation unit may generate the second gray codes by sequentially inserting the third gray codes into the MSBs of the second gray codes and sequentially inserting the first gray codes into the LSBs of the second gray codes.

The second gray code generation unit may generate the second gray codes by sequentially inserting the first gray codes into a predetermined number of LSBs.

According to another aspect of the present invention, there is provided a computer readable recording medium having recorded thereon a computer program for executing the image processing method.

According to another aspect of the present invention, there is provided a computer readable recording medium having recorded thereon a computer program for executing the image decoding method.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1A:
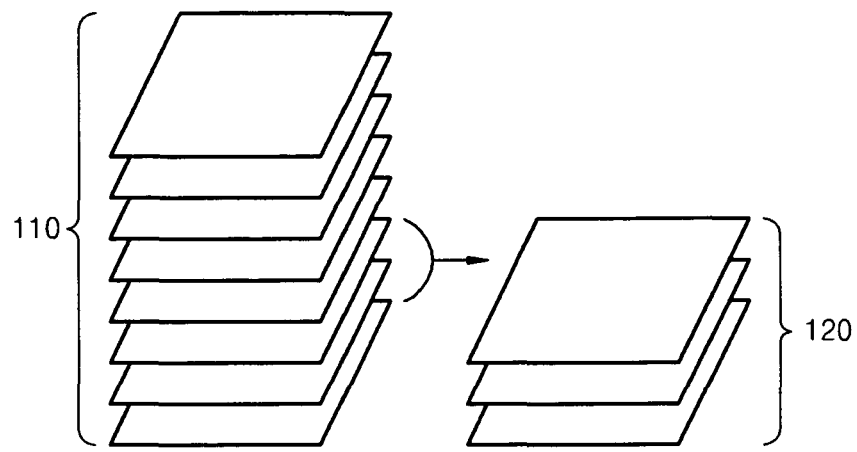
FIGS. 1A and 1B are a diagram and a flowchart, respectively, for describing a related art method of separating n least significant bit-planes from an image formed of N bit-planes.
Figure 1B:
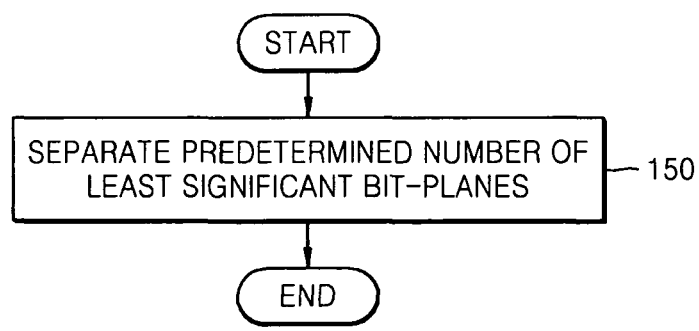
Figure 2:
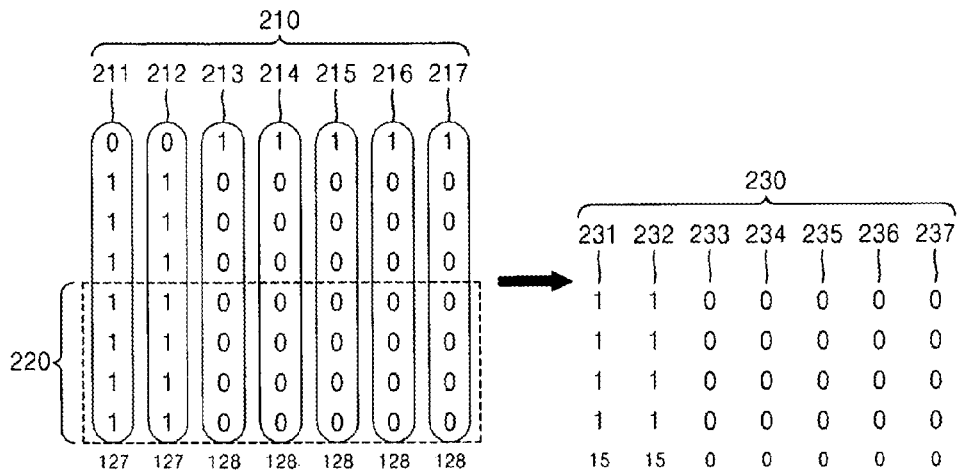
FIG. 2 is a diagram illustrating bitstreams and bit-planes according to related FIGS. 1A and 1B.
Figure 3:
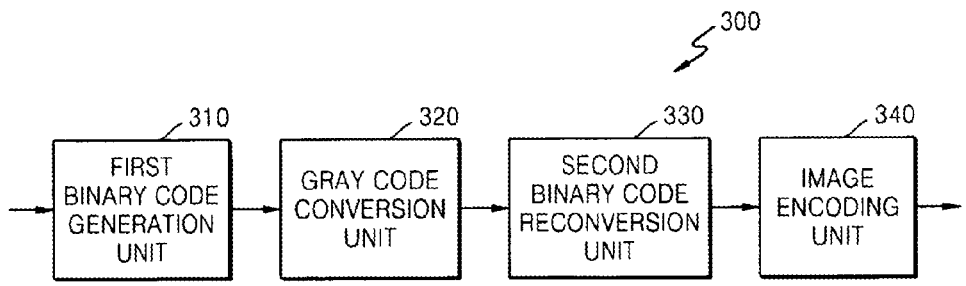
FIG. 3 is a block diagram of an image processing apparatus according to an exemplary embodiment of the present invention.

FIG. 3 is a block diagram of an image processing apparatus 300 according to an exemplary embodiment of the present invention.

Referring to FIG. 3, the image processing apparatus 300 includes a first binary code generation unit 310, a gray code conversion unit 320, and a second binary code reconversion unit 330.

The first binary code generation unit 310 represents pixel values of an input image by using binary codes so as to generate first binary codes, and then outputs the generated first binary codes to the gray code conversion unit 320.

The first binary code generation unit 310 may generate first bit-planes which are obtained by forming the first binary codes regarding the pixel values of the input image, into a bit-plane format.

The gray code conversion unit 320 converts the first binary codes input from the first binary code generation unit 310, into gray codes, determines a predetermined number of sequential LSBs from among the gray codes, and outputs the determined LSBs of the gray codes to the second binary code reconversion unit 330. In this case, if the gray codes regarding the pixel values of the input image are represented by using N bits, the predetermined number of sequential LSBs may include only the LSB, which is the lowest-order bit, or may include sequential LSBs from the lowest-order LSB to a predetermined-order bit that is not the MSB.

The gray code conversion unit 320 may generate second bit-planes in order to represent the gray codes regarding the pixel values of the input image, into a bit-plane format. Thus, least significant bit-planes corresponding to the LSBs of the gray codes are determined from among the second bit-planes and are output to the second binary code reconversion unit 330.

The second binary code reconversion unit 330 receives the LSBs of the gray codes from the gray code conversion unit 320, converts the LSBs of the gray codes into binary codes so as to generate second binary codes, and outputs the second binary codes.

The second binary code reconversion unit 330 may generate third bit-planes which are obtained by forming the second binary codes, into a bit-plane format.

The image processing apparatus may further include an image encoding unit 340 which encodes the input image by using the second binary codes output by the second binary code reconversion unit 330.

Although not shown, the image processing apparatus 300 may include various post processing units using the LSBs of the gray codes regarding the pixel values of the input image. For example, when an image is compressed, MSBs and LSBs of the gray codes regarding the pixel values of the input image may be separately encoded. An LSB probably has a value 0 and thus it is more effective to separately encode the MSBs and the LSBs in an encoding operation.

Figure 4:
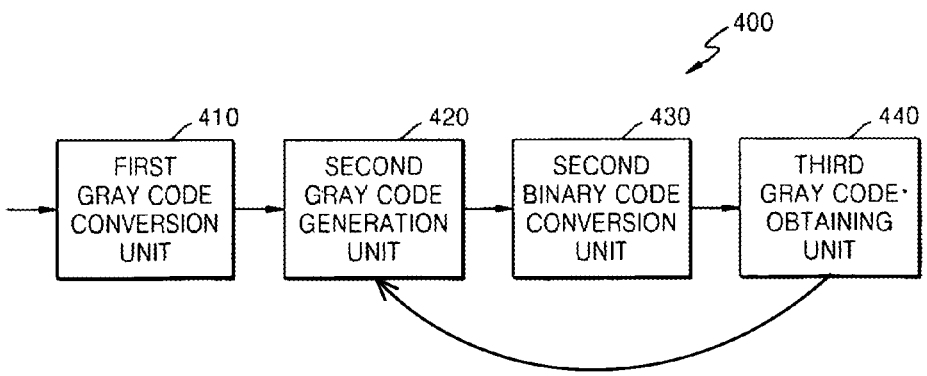
FIG. 4 is a block diagram of an image decoding apparatus according to an exemplary embodiment of the present invention.

FIG. 4 is a block diagram of an image decoding apparatus 400 according to an exemplary embodiment of the present invention.

Referring to FIG. 4, the image decoding apparatus 400 includes a first gray code conversion unit 410, a second gray code generation unit 420, and a second binary code conversion unit 430.

The first gray code conversion unit 410 converts received first binary codes into a gray code format so as to generate first gray codes, and outputs the generated first gray codes to the second gray code generation unit 420.

The first gray code conversion unit 410 may receive the first binary codes in a bit-plane format, convert the first binary codes into the gray code format, and thus generate the first gray codes in a bit-plane format.

The second gray code generation unit 420 generates second gray codes including the first gray codes output by the first gray code conversion unit 410, and outputs the second gray codes to the second binary code conversion unit 430. The first gray codes are sequentially inserted into LSBs of the second gray codes such that the number of bits of the first gray codes corresponds to the number of the LSBs of the second gray codes.

When the first gray codes are inserted into the LSBs of the second gray codes, the number of the LSBs is not limited to one. In more detail, the LSBs of the second gray codes may be a set of a predetermined number of sequential bits from the LSB, in which the MSB is not included.

The image decoding apparatus 400 may further include a third gray code obtaining unit 440 which obtains third gray codes for MSBs of the second gray codes. The second gray code generation unit 420 receives the third gray codes from the third gray code obtaining unit, and inserts the third gray codes into sequential MSBs of the second gray codes. Thus, the second gray codes may be completely formed.

The second gray code generation unit 420 may generate the second gray codes in a bit-plane format.

The second binary code conversion unit 430 converts the second gray codes input from the second gray code generation unit 420, into a binary code format so as to generate second binary codes. In this case, the second binary codes may be generated in a bit-plane format.

A method of processing binary codes and gray codes regarding pixel values of an input image in a bit-plane format will now be described with reference to FIGS. 5 and 6.

Figure 5:
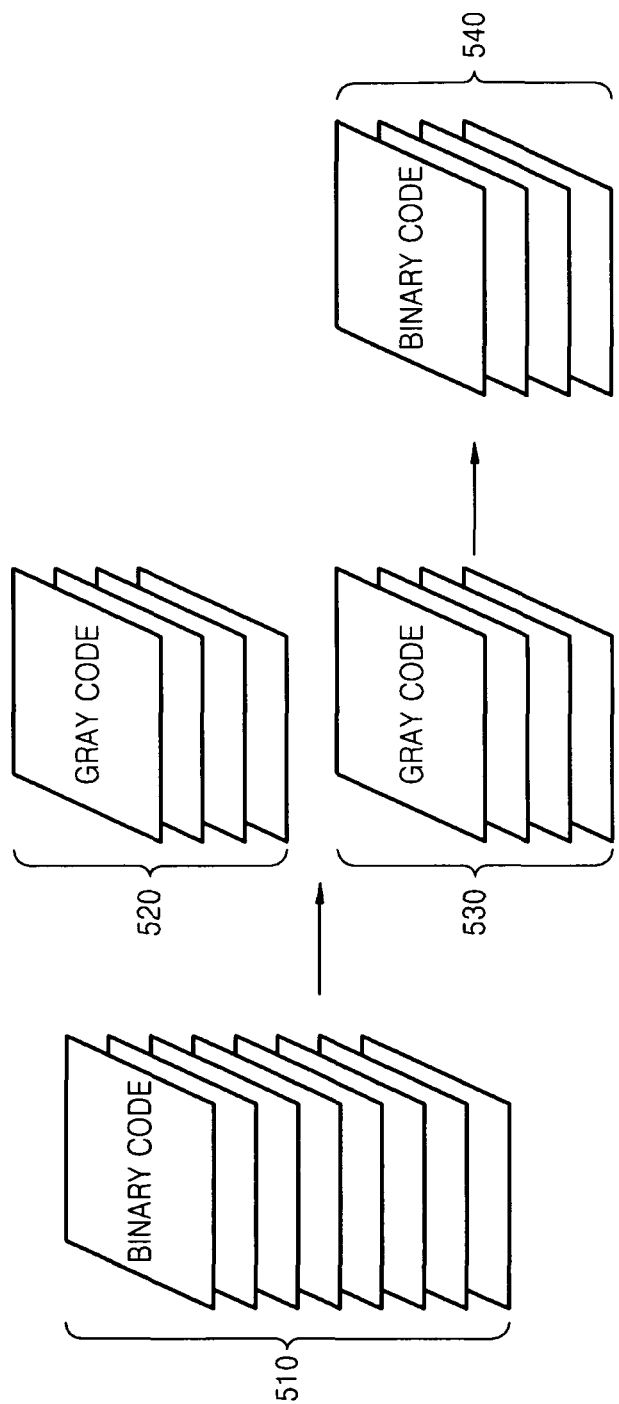
FIG. 5 is a diagram for describing a method of separating least significant bit-planes from bit-planes of an image, according to an exemplary embodiment of the present invention.

FIG. 5 is a diagram for describing a method of separating least significant bit-planes from bit-planes of an image, according to an exemplary embodiment of the present invention. FIG. 5 will be described in conjunction with FIG. 3.

Referring to FIG. 5, the first binary code generation unit 310 generates N-bit binary code bit-planes 510 regarding pixel values of an input image. In FIG. 5, eight-bit binary code bit-planes are generated.

The gray code conversion unit 320 converts the binary code bit-planes 510 into gray code bit-planes, and separates the gray code bit-planes into a predetermined number of most significant bit-planes 520 and other least significant bit-planes 530. In FIG. 5, the gray code bit-planes are separated into four most significant bit-planes and four least significant bit-planes.

The second binary code reconversion unit 330 converts only the least significant bit-planes 530 of the gray code bit-planes into a binary code format so as to generate binary code bit-planes 540 including four LSBs from the LSB.

Figure 6:
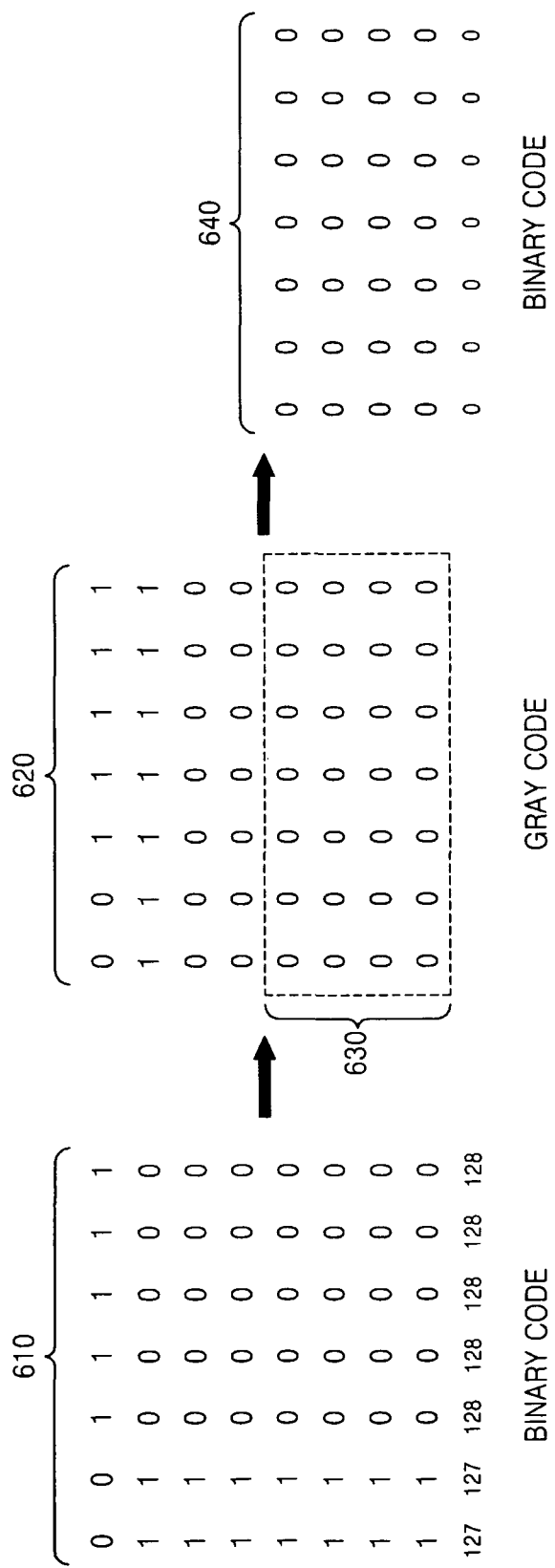
FIG. 6 is a diagram illustrating binary/gray codes processed according to an exemplary embodiment of the present invention.

FIG. 6 is a diagram illustrating binary/gray codes processed according to an exemplary embodiment of the present invention. FIG. 6 will be described in conjunction with FIGS. 3 and 4.

Referring to FIG. 6, the first binary code generation unit 310 generates first binary codes 610. In FIG. 6, eight-bit binary codes are generated. The four-LSB binary codes of the first binary codes 610 have the values of 15, 15, 0, 0, 0, 0, and 0 respectively which have less correlation and similarity with neighboring pixels than the values 127, 127, 128, 128, 128, 128, and 128 respectively of the original eight-bit binary codes.

The gray code conversion unit 320 converts the first binary codes 610 into gray codes 620. Also, a predetermined number of LSB gray codes 630 are determined from among the gray codes 620. In FIG. 6, four-LSB gray codes are determined.

The second binary code reconversion unit 330 converts the LSB gray codes 630 into a binary code format so as to generate second binary codes 640. The second binary codes 640 have values 0, 0, 0, 0, 0, 0, and 0 respectively which have more correlation and similarity with neighboring pixels than the values 15, 15, 0, 0, 0, 0, and 0 of the four-LSB binary codes of the first binary codes 610. This is because gray codes have smaller variations in bits in accordance with sequential variations in pixel values, in comparison to binary codes.

In the image decoding apparatus 400, the first gray code conversion unit 410 receives the second binary codes 640 so as to convert the second binary codes 640 into first gray codes, the second gray code generation unit 420 generates the gray codes 620 as second gray codes by inserting the first gray codes into the second gray codes as the LSB gray codes 630, and the second binary code conversion unit 430 reconverts the second gray codes into the first binary codes 610. Thus, an image is restored.

Figure 7:
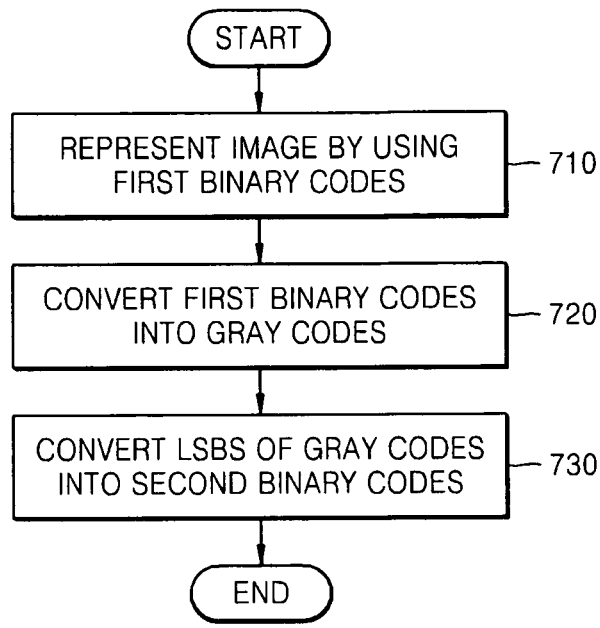
FIG. 7 is a flowchart of an image processing method according to an exemplary embodiment of the present invention.

FIG. 7 is a flowchart of an image processing method according to an exemplary embodiment of the present invention.

Referring to FIG. 7, in operation 710, first binary codes representing pixel values of an input image by using binary codes are generated. The first binary codes may be generated in a bit-plane format.

In operation 720, the first binary codes are converted into gray codes and a predetermined number of sequential LSBs are determined from among the gray codes. The gray codes may be generated in a bit-plane format. The LSBs may include only the LSB or may include sequential LSBs from the LSB to an nth bit that is not the MSB.

In operation 730, the determined sequential LSBs of the gray codes are converted into a binary code format so as to generate second binary codes. The second binary codes may also be generated in a bit-plane format and various post processes using only the second binary codes are possible.

Figure 8:
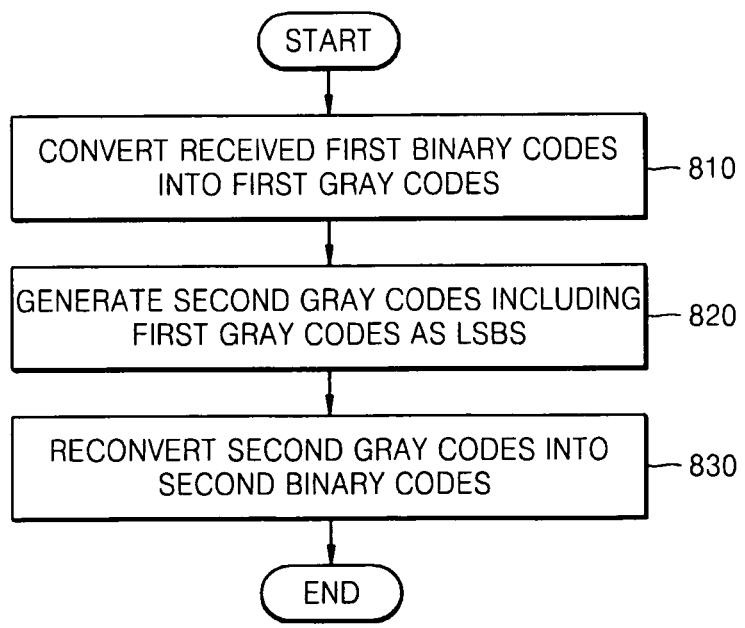
FIG. 8 is a flowchart of an image decoding method according to an exemplary embodiment of the present invention.

FIG. 8 is a flowchart of an image decoding method according to an exemplary embodiment of the present invention.

Referring to FIG. 8, in operation 810, received first binary codes are converted into a gray code format so as to generate first gray codes. The first binary codes or the first gray codes may be generated in a bit-plane format.

In operation 820, second gray codes including the first gray code as sequential LSBs are generated. The first gray codes may be sequentially inserted from the LSB of the second gray codes. Gray codes obtained through a different path from the sequential LSBs may be inserted into MSBs of the second gray codes.

In operation 830, the second gray codes are converted into a binary code format so as to generate second binary codes. As such, an image of the second binary codes may be restored.

The exemplary embodiments of the present invention can be written as computer programs recorded on a computer readable recording medium and can be implemented in general-use digital computers that execute the programs using the computer readable recording medium. Examples of the computer readable recording medium include magnetic storage media (e.g., ROMs, floppy disks, hard disks, etc.), and optical recording media (e.g., CD-ROMs, or DVDs).

As described above, according to the exemplary embodiments of the present invention, when predetermined least significant bit-planes are separated from an image represented by using a plurality of bit-planes, correlations between neighboring pixels may be maintained by converting binary code bit-planes into gray code bit-planes and reconverting LSBs of the gray code bit-planes into binary bits.

By maintaining correlations between neighboring pixels, efficiency of various image processing operations using LSBs may be improved. In particular, when an image is compressed, an image compression rate of LSBs may be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image encoding method comprising:
   generating first binary codes by converting pixel values of an input image into a binary code format;
   converting the first binary codes into gray codes;
   generating second binary codes by converting only a predetermined number of sequential least significant bits (LSBs) of the gray codes into the binary code format; and
   encoding the second binary codes and third binary codes separately,
   wherein the third binary codes is converted from sequential most significant bits (MSBs) of the gray codes other than the sequential LSBs.

2. The image encoding method of claim 1, wherein the generating the first binary codes comprises determining the predetermined number of sequential LSBs from among the gray codes.

3. The image encoding method of claim 2, wherein the generating the first binary codes comprises generating first bit-planes for the first binary codes of the input image, and
   the converting the first binary codes into the gray codes comprises:
   converting the first bit-planes into second bit-planes for the gray codes of the input image; and
   determining least significant bit-planes corresponding to the predetermined number of sequential LSBs of the second bit-planes.

4. The image encoding method of claim 3, wherein the generating the second binary codes comprises generating third bit-planes for the second binary codes by converting the least significant bit-planes into the binary code format.

5. The image encoding method of claim 1, further comprising encoding the input image by using the generated second binary codes.

6. A non-transitory computer readable recording medium having recorded thereon a computer program for executing the method of claim 1.

7. An image decoding method comprising:
   generating first gray codes by converting first binary codes into a gray code format;
   generating second gray codes comprising the first gray codes as sequential least significant bits (LSBs);
   generating second binary codes by converting the second gray codes into a binary code format;
   obtaining third gray codes for most significant bits (MSBs) of the second gray codes; and
   decoding the second binary codes and third binary codes separately,
   wherein the third binary codes is converted from sequential most significant bits (MSBs) of the gray codes other than the sequential LSBs, and
   wherein the generating the second gray codes comprises generating the second gray codes by sequentially inserting the third gray codes into the MSBs of the second gray codes and sequentially inserting the first gray codes into the LSBs of the second gray codes.

8. The image decoding method of claim 7, wherein at least one of the first binary codes, the first gray codes, and the second gray codes are formed in a bit-plane format.

9. The image decoding method of claim 7, wherein the generating the second gray codes comprises generating the second gray codes by sequentially inserting the first gray codes into a predetermined number of LSBs.

10. A non-transitory computer readable recording medium having recorded thereon a computer program for executing the method of claim 7.

11. An image encoding apparatus comprising:
    a processor;
    memory storing executable instructions that, when executed by the processor, causes the processor to execute:
    a first binary coder which generates first binary codes by converting pixel values of an input image into a binary code format;
    a gray code converter which converts the first binary codes into gray codes; and
    a second binary coder which generates second binary codes by converting only a predetermined number of sequential least significant bits (LSBs) of the gray codes into the binary code format; and
    an encoder which encodes the second binary codes and third binary codes separately,
    wherein the third binary codes is converted from sequential most significant bits (MSBs) of the gray codes other than the sequential LSBs.

12. The image encoding apparatus of claim 11, wherein the first binary coder determines the predetermined number of sequential LSBs from among the gray codes.

13. The image encoding apparatus of claim 12, wherein the first binary coder generates first bit-planes for the first binary codes of the input image, and
    the gray code converter converts the first bit-planes into second bit-planes for the gray codes of the input image, and determines least significant bit-planes corresponding to the predetermined number of sequential LSBs of the second bit-planes.

14. The image encoding apparatus of claim 13, wherein the second binary coder generates third bit-planes for the second binary codes by converting the least significant bit-planes into the binary code format.

15. The image encoding apparatus of claim 11, further comprising an image encoder which encodes the input image by using the generated second binary codes.

16. An image decoding apparatus comprising:
    a processor;
    memory storing executable instructions that, when executed by the processor, causes the processor to execute:
    a first gray coder which generates first gray codes by converting first binary codes into a gray code format;
    a second gray coder which generates second gray codes comprising the first gray codes as sequential least significant bits (LSBs);
    a binary code converter which generates second binary codes by converting the second gray codes into a binary code format;
    a third gray coder which obtains third gray codes for most significant bits (MSBs) of the second gray codes; and
    a decoder which decodes the second binary codes and third binary codes separately, wherein the third binary codes are converted from sequential most significant bits (MSBs) of the gray codes other than the sequential LSBs, and wherein the second gray coder generates the second gray codes by sequentially inserting the third gray codes into the MSBs of the second gray codes and sequentially inserting the first gray codes into the LSBs of the second gray codes.

17. The image decoding apparatus of claim 16, wherein at least one of the first binary codes, the first gray codes, and the second gray codes are formed in a bit-plane format.

18. The image decoding apparatus of claim 16, wherein the second gray coder generates the second gray codes by sequentially inserting the first gray codes into a predetermined number of LSBs.

* * * * *